(12) United States Patent
Lindfield

(10) Patent No.: US 6,607,054 B1
(45) Date of Patent: Aug. 19, 2003

(54) SAFETY DEVICE

(75) Inventor: John Sidney Lindfield, South Gloucestershire (GB)

(73) Assignee: Rota Limited, West Midlands (GB)

( * ) Notice: Subject to any disclaimer, the term of this patent is extended or adjusted under 35 U.S.C. 154(b) by 0 days.

(21) Appl. No.: 09/869,561

(22) PCT Filed: Oct. 26, 1999

(86) PCT No.: PCT/GB99/03520

§ 371 (c)(1),
(2), (4) Date: Jun. 29, 2001

(87) PCT Pub. No.: WO00/26548

PCT Pub. Date: May 11, 2000

(30) Foreign Application Priority Data

Oct. 31, 1998 (GB) ............................................. 9823759

(51) Int. Cl.[7] ............................................... A62B 35/00
(52) U.S. Cl. ........................ 182/113; 182/45; 248/205.8
(58) Field of Search ................ 182/113, 45; 248/205.8, 248/205.9

(56) References Cited

U.S. PATENT DOCUMENTS

| 2,871,053 | A | * | 1/1959 | Richter |
| 3,059,952 | A | * | 10/1962 | Wittman |
| 3,910,620 | A | * | 10/1975 | Sperry |
| 4,134,162 | A |   | 1/1979 | Sharland et al. |
| 4,261,279 | A |   | 4/1981 | Johnson |
| 4,291,866 | A |   | 9/1981 | Petersen |
| 4,653,416 | A |   | 3/1987 | Debarge |
| 4,887,820 | A |   | 12/1989 | Amici et al. |
| 4,979,457 | A |   | 12/1990 | Sommerhauser et al. |
| 5,211,435 | A |   | 5/1993 | Nagai et al. |
| 5,676,085 | A |   | 10/1997 | Michl |
| 5,715,876 | A |   | 2/1998 | Burt |
| 6,143,391 | A | * | 11/2000 | Barnes |
| 6,272,800 | B1 | * | 8/2001 | Phinney ..................... 182/113 |

FOREIGN PATENT DOCUMENTS

| EP | 0125550 | 11/1984 |
| EP | 0220407 | 5/1987 |
| GB | 2313396 | 11/1997 |

* cited by examiner

*Primary Examiner*—Alvin Chin-Shue
(74) *Attorney, Agent, or Firm*—Wenderoth, Lind & Ponack, L.L.P.

(57) ABSTRACT

There is provided a sealing device with a support portion and a sealing member. The support portion has a cover plate and a peripheral wall. In the center of the support portion is a central boss which is provided with a blind hole. The boss also has an arm which can be rotated about the boss due to a retaining plate. The blind hole in the boss can be used for receiving stems of various equipment, such as bars, railings, or ladders.

3 Claims, 5 Drawing Sheets

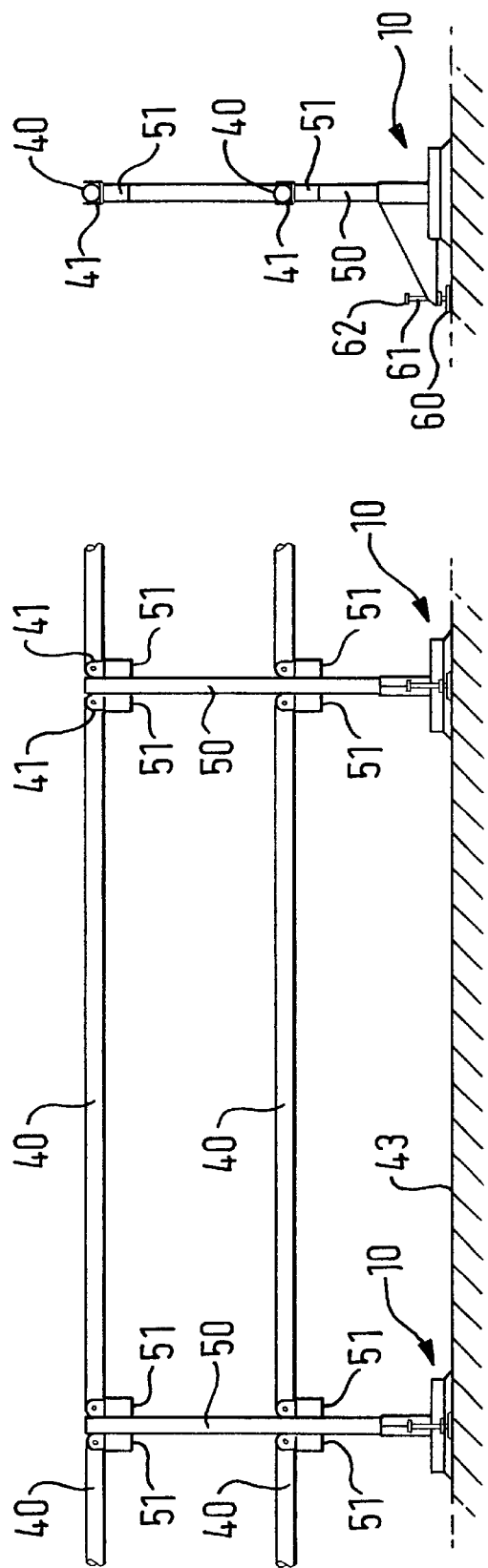
FIG. 9
FIG. 8
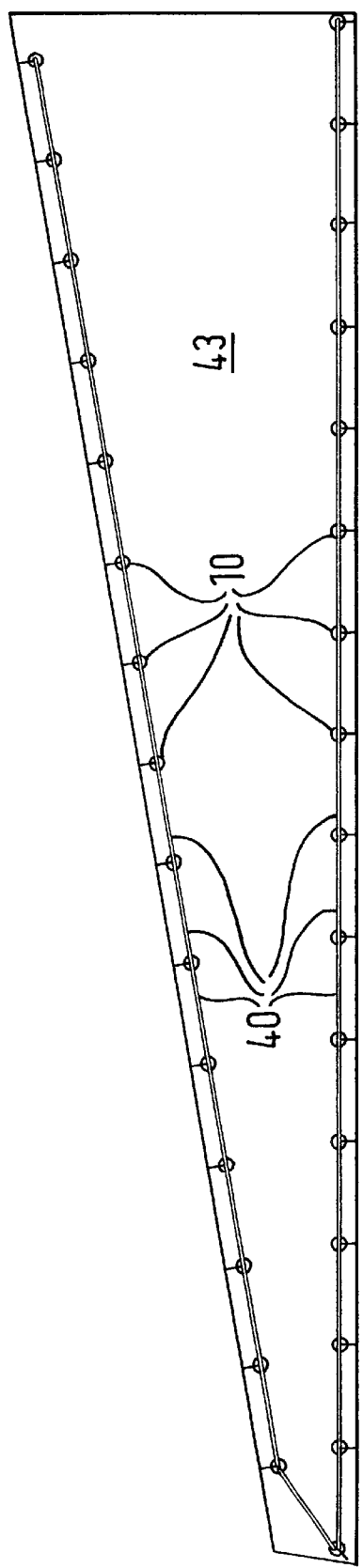
FIG. 10

SAFETY DEVICE

FIELD OF THE INVENTION

This invention relates to a safety device and more particularly, but not exclusively, to safety devices for use on large structures, such as aircraft wings, ships, storage silos, tanks, etc., to enable safe inspection or maintenance of such structures.

SUMMARY OF THE INVENTION

According to a first aspect of the present invention there is provided a safety device comprising a vacuum anchor having a sealing member for contact with a surface, a support portion attached to the sealing member and means for producing a vacuum below the sealing member such that the safety device is held with respect to the surface by suction, the support portion having a boss adapted to receive additional equipment.

Preferably the sealing member is substantially circular and the boss is centrally located.

It is a preferred feature that the boss has a central, axially extending, blind bore to allow insertion of a mating part of the additional equipment.

Another preferred feature is that the support portion includes a radially extending arm which is rotatably mounted on the boss and which has one or more holes for attachment of a safety line. The arm may have a collar portion which is disposed around the boss and which is retained thereon by means of a removable retaining plate.

Conveniently, the sealing member comprises a base plate to which the boss is attached and a sealing ring secured with respect to the base plate and extending about the periphery of the base plate. The sealing ring may be clamped with respect to the base plate by means of a circular clamping ring. In some embodiments, the sealing ring has a pair of concentric main sealing lips and an additional secondary peripheral sealing lip which is radially outwardly disposed from the main sealing lips. Preferably, the secondary sealing lip has an outward facing surface which has at least one and preferably two peripheral reinforcing ribs.

The sealing ring is formed from rubber or synthetic rubber, preferably from nitrile rubber—acrylonitrile butadiene rubber (NBR).

Ideally, the vacuum means comprises a vacuum reservoir which is adapted to be connected to a vacuum via a non-return valve and which communicates with the sealing member via a manual control valve and normally the vacuum means includes a vacuum gauge.

Preferably, the support portion incorporates a rigid cover to protect the vacuum means which is disposed between the cover and the sealing member. Also, the additional equipment may include tools, ladders, safety barriers, handrails.

According to a second aspect of the present invention, there is provided a safety system comprising a plurality of safety devices as described above and one or more bar means extending therebetween.

In some embodiments, the or each bar means comprising a tube hingedly connected at each end to a coupling which cooperates with the boss of a safety device.

In further embodiments, the bar means comprises a safety barrier having an upright member at each end, each upright member cooperating with the boss of a safety device and having at least one bracket for receiving one of the couplings which are hingedly connected to the tube. Conveniently, a bracing foot is adjustably secured at the radially outermost end of the radially extending arm of each safety device.

According to a third aspect of the present invention, there is provided a safety device comprising a vacuum anchor having a sealing member for contact with a surface, a support portion attached to the sealing member and means for producing a vacuum below the sealing member such that the safety device is held with respect to the surface by suction. The sealing member has a sealing ring which has a pair of concentric main sealing lips and an additional secondary sealing lip outwardly disposed therefrom, the secondary sealing lip having on an outward facing surface and at least one and preferably two peripheral reinforcing ribs. Normally, the sealing lips are generally triangular in section when relaxed with the secondary lip projecting axially further than the main lips for providing a pre-seal.

BRIEF DESCRIPTION OF THE DRAWINGS

Embodiments of the present invention will now be described in more detail. The description makes reference to the accompanying diagrammatic drawings in which:

FIG. 8 is a front view of a safety barrier extending between two safety devices;

FIG. 9 is a side view of the FIG. 8 arrangement;

FIG. 10 is a plan view of the safety barrier system of FIGS. 8 and 9 attached to an aircraft wing;

DETAILED DESCRIPTION OF THE INVENTION

Figure 1:
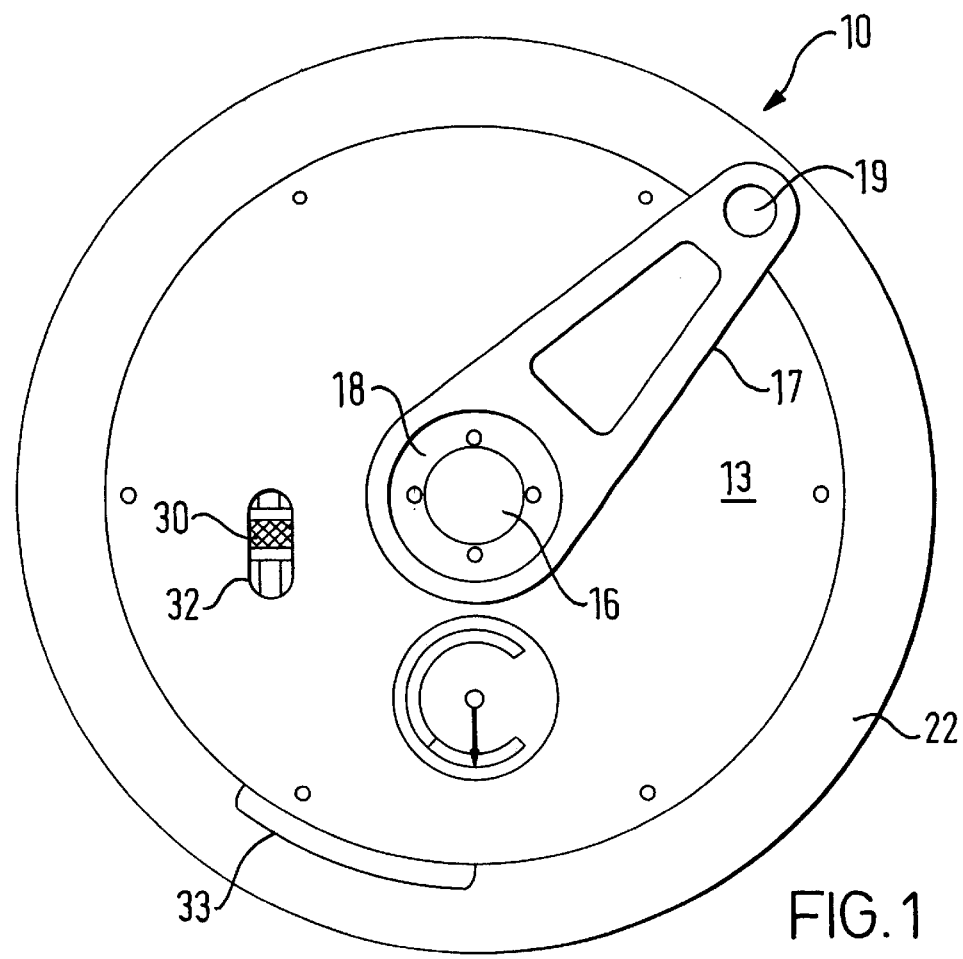
FIG. 1 is a plan view of a safety device according to the present invention.
Figure 2:
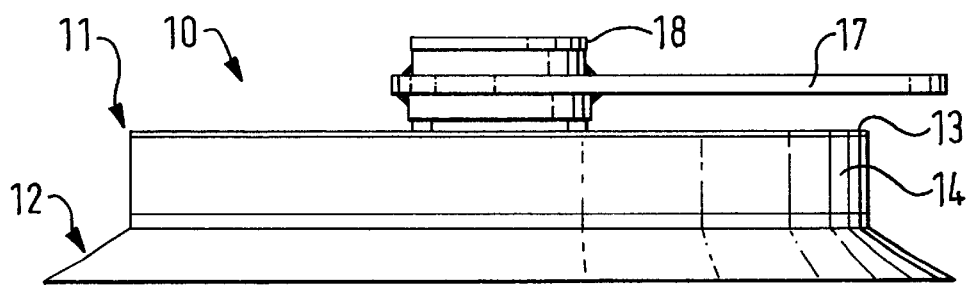
FIG. 2 is a side view of FIG. 1.
Figure 3:
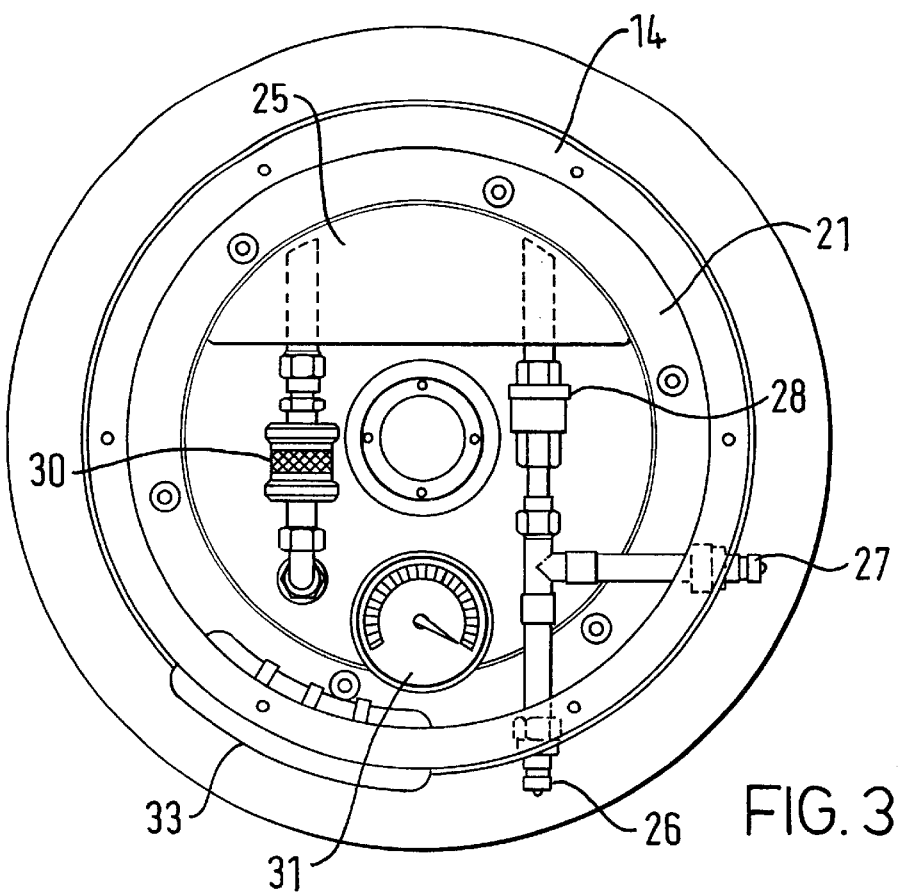
FIG. 3 is a cut away plan of the safety device with some parts omitted for clarity.
Figure 4:
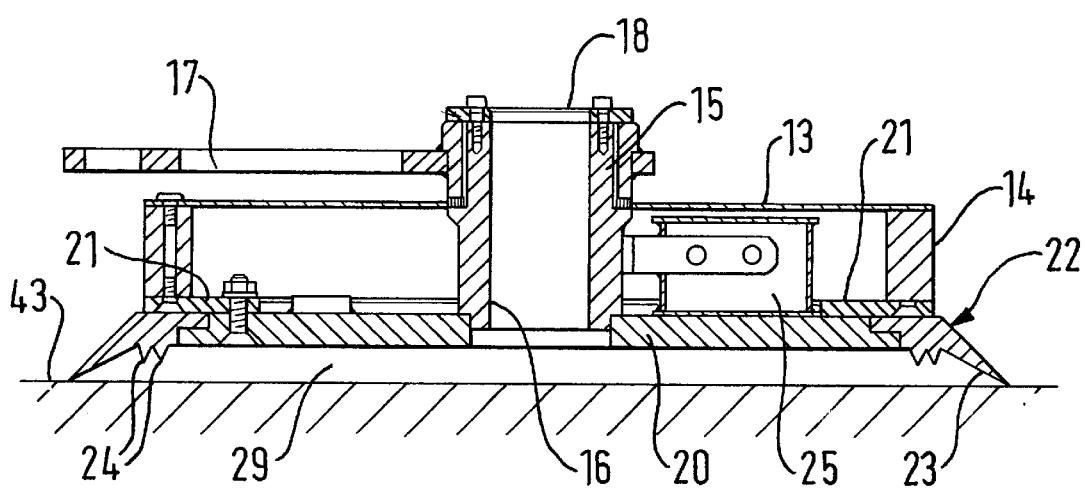
FIG. 4 is a sectional view taken on line IV—IV of FIG. 1, with the device resting on a surface and with the arm in an alternative position.

In the Figures, there is shown a safety device 10 comprising a support portion 11 and a sealing member 12. The support portion 11 comprises a housing in the form of a cover plate 13 secured to a peripheral wall 14. In the center of the support portion 11 is a central boss 15 which has a blind hole 16 formed therein. A removable cover may be provided, such as a bung or cap, to prevent contamination of the hole 16.

An arm 17 is provided on the boss 15 for rotation thereabout and the arm 17 has a collar which is retained on the boss 15 by a removable retaining plate 18. The arm 17 has a hole 19 towards its radially outermost end for attachment of a safety line by suitable clip means.

The sealing member 12 comprises a circular rigid plate 20 to which is clamped, by way of a circular clamp ring 21, a circular sealing ring 22 formed from acrylonitrile butadiene rubber (NBR). The sealing ring 22 has a pair of concentric primary sealing lips 24 and an outer secondary sealing lip 23, all of which lips have generally triangular cross-sections. The peripheral wall 14 is also attached to the clamp ring 21.

Between the cover plate 13 and the plate 20 are vacuum means or a vacuum assembly comprising a vacuum reservoir 25 which becomes evacuated when either of two quick release couplings 26, 27 is connected to a vacuum source (not shown) which is fully portable and easily carried by one worker. The vacuum source is preferably fitted with audible and visual means of warning the worker if either the gas supply or vacuum levels fall below the correct operating range. The warnings are ideally sustained for not less than 1 minute even in the complete absence of an incoming gas supply. The warnings are ideally powered by the gas which is powering the vacuum source so as to maintain the intrinsically safe nature of the equipment. The warning equipment gas supply is preferably automatically recharged within 1 minute of the equipment being put into service.

A non-return valve 28 is connected between the reservoir 25 and the couplings 26, 27. The reservoir 25 also communicates via a vacuum control valve 30 and through the plate 20 with the space 29 defined by the sealing member 12 when it is applied to a surface 43, such as an aircraft wing. A pressure gauge 31 is also provided to indicate the pressure in the space 29 when the safety device is being used. A small slot 32 is provided in the cover plate 13 to give finger access to the control valve 30.

To attach the safety device 10 to the surface 43, such as an aircraft wing, the device is placed on the surface which is ideally clean to ensure good, secure attachment. A vacuum supply is attached to one of the couplings 26, 27 which thus evacuated the reservoir 25. With the control valve 30 in its 'on' position the space 29 becomes evacuated and the device is thus held securely to the surface by atmosphere pressure. The secondary sealing lip 23 provides a pre-seal, but as the suction draws the device 10 towards the surface 43, the main sealing lips 24 engage and become compressed by the surface. The radially innermost lip 24 constitutes a main seal with the other lip 24 being a back-up. The vacuum supply could supply a number of safety devices 10 using the unused coupling 26, 27 of the first device with a suitable connecting line leading to one of the couplings of a second device and so on.

Ideally, the gauge 31 indicates when there is sufficient vacuum in the space 29 for the device to be safe and there are certain British and other national standards which outline the forces that the devices must withstand. The devices can even still be used for a time after the vacuum supply has been removed, preferably not less than twenty minutes, although the vacuum in the space 29 and reservoir 25 eventually reduces thereby reducing the effectiveness of the device in such situations.

To remove the safety device 10, the control valve 30 is moved into its 'off' position and the space 29 is vented to the atmosphere. A small residual vacuum may remain thus necessitating a small effort to lift the device 10 from the surface.

In this embodiment, the main components are of aluminum construction and the safety device is lightweight and easy to carry using a pull out handle 33 attached to the peripheral wall 14. Also, the NBR sealing ring 22 allows operation at a range of temperatures −20° C. to +30° C. in accordance with NATO and Ministry of Defense standards. A further advantage of this temperature range is that nitrogen can be used to generate the vacuum in the vacuum supply rather than compressed air, even though nitrogen requires components able to operate at low temperatures. The desirability of using nitrogen or even other inert gases is that it is readily available in airports and is used, for example, in inflating plane tires rather than air so as not to provide a source of air should there be a fire.

Figure 6:
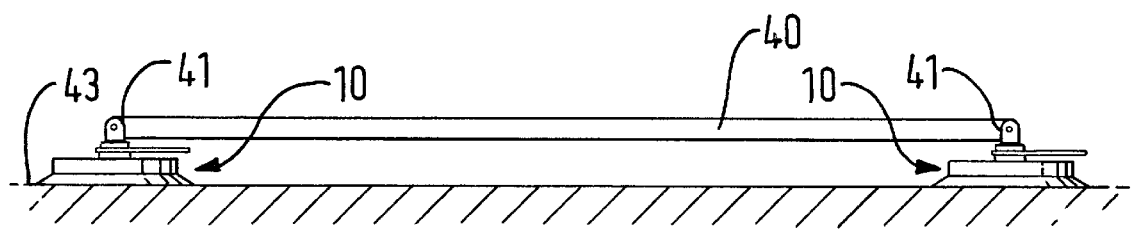
FIG. 6 is a reduced front view of FIG. 5 handrail connected between two safety devices.

The rotating arm 17 with a safety line attached to it gives a worker a certain working circle, but it is often desirable to cover a greater area. Therefore, the safety devices 10 enable a bar 40 or bar assembly to be secured between two spaced devices 10. The bar 40 is hingedly connected at each end to a coupling 41 which has a projecting stem 42 which can be slidably received in the blind hole 16 in the boss 15 of the safety device 10. A simple arrangement is shown in FIG. 6 in which two safety devices are secured on the surface 43. The stems 42 at each end of the bar 40 have been slotted into the respective holes 16 in the bosses 15. A worker can attach his safety line to the bar 40 and thereby increase his potential working area. The bar length would typically be two meters with the bar being strong enough to meet the various safety standards mentioned previously, but other lengths would be possible. For example, a longer flexible anchorage line of up to 10 meters can be hung from the device provided that the safety device is always positioned above the worker and the anchorage line is fitted with a required guided type fall arrester or "rope grabber". The rope grabber allows passage of the line in either vertical direction by a mechanism operated by the worker, this mechanism automatically locking on to the line when the worker is not maintaining pressure on a locking arm. The line and rope grabber are covered by various safety standards.

Figure 7:
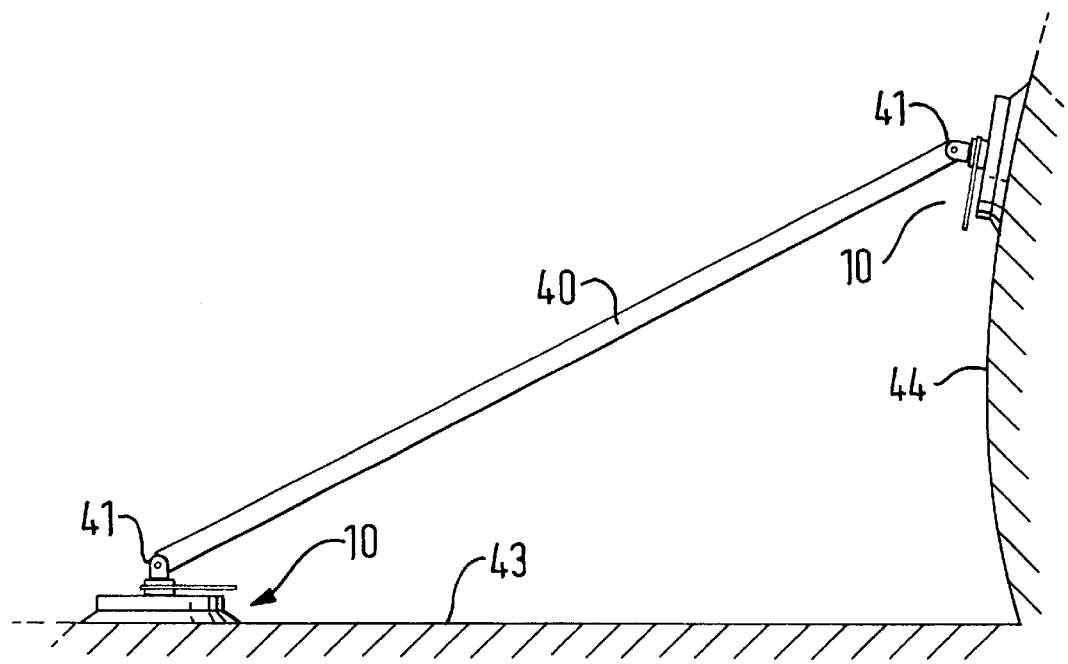
FIG. 7 is a reduced front view similar to FIG. 6 in an alternative position.

FIG. 7 shows the safety device 10 and the bar 40 in different positions. One device 10 is attached to a generally horizontal surface 43 such as an airplane wing and the other device 10 is attached to an upstanding surface such as a fuselage 44. The bar 40 can act as a handrail in this configuration, as well as a bar for attachment of a worker's safety line.

The boss 15 of the safety device can also receive a tool holder for tools such as heat lamps which are used frequently in aircraft maintenance. The holder, which is not shown, would have a stem for insertion into the hole 16 of the boss 15 and a position adjustable arm with means for securing a tool to the arm.

Figure 5:
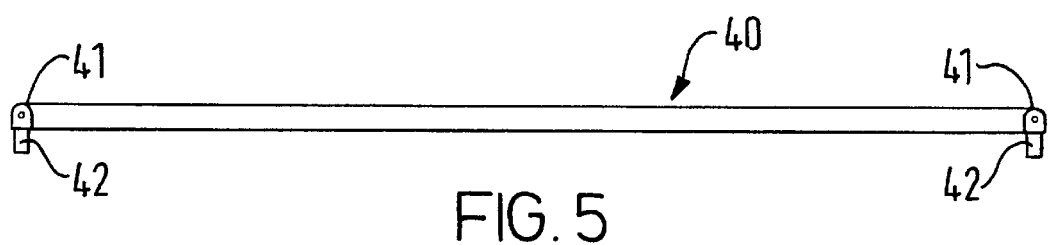
FIG. 5 is a front view of a handrail.

FIGS. 8 to 10 show a further embodiment which incorporates the bars 40 shown in FIGS. 5 to 7. Inspection of a large surface, such as an aircraft wing 43, can require a safety barrier to be installed around the edge of the wing as shown in FIG. 10. A number of the safety devices 10 are secured at spaced locations around the edge of the wing and a barrier post 50 having a suitable stem, is inserted into the hole 16 in each boss 15. Each barrier post 50 has two pairs of stem receiving brackets 51 such that the stems of bars 40 can be slotted into the brackets 51 of adjacent posts 50. Although the bars 40 are shown as perpendicular to the posts 50, they could be at other angles by virtue of the hinge connection between each bar 40 and its end couplings 41. The bars 40, therefore, have multiple uses.

With such safety barrier installations, it is preferable to have a bracing foot 60 radially offset from the central boss, which foot is disposed outward of the working area. Such a foot 60 is shown in FIGS. 8 to 10 and is adjustably attached to a sleeve pushed on to the rotatable arm 17 of each safety device. The vertical position of each foot can be varied by means of a screw threaded pin 61 and turning knob 62 and the sleeve ensures that the foot is spaced from the sealing member 12.

Also, a ladder receiving attachment is envisaged having a sleeve portion for receiving a foot of a ladder, which sleeve portion is hingedly connected to a stem 42 for insertion in the hole 16 of the boss 15. Two such attachments and two safety devices 10 would of course be needed for each ladder although a single stem/double sleeve portion arrangement would be possible. These attachments would enable ladders to be positioned at any suitable angle, for example, resting against an aircraft fuselage, and would provide a non-marking base for the feet of the ladder.

Figure 11:
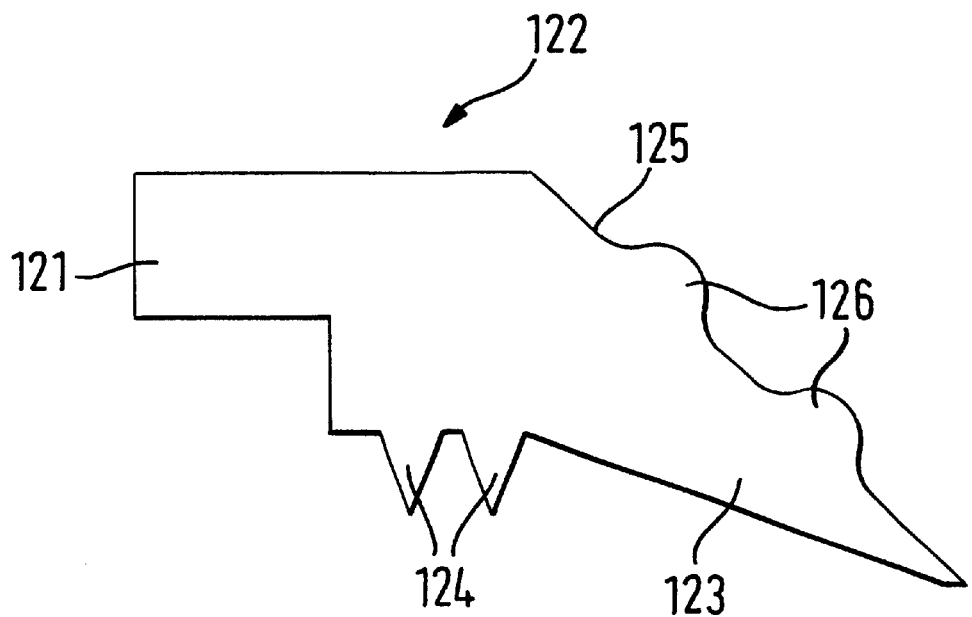
FIG. 11 is a sectional view through a preferred sealing ring in a relaxed state.
Figure 12:
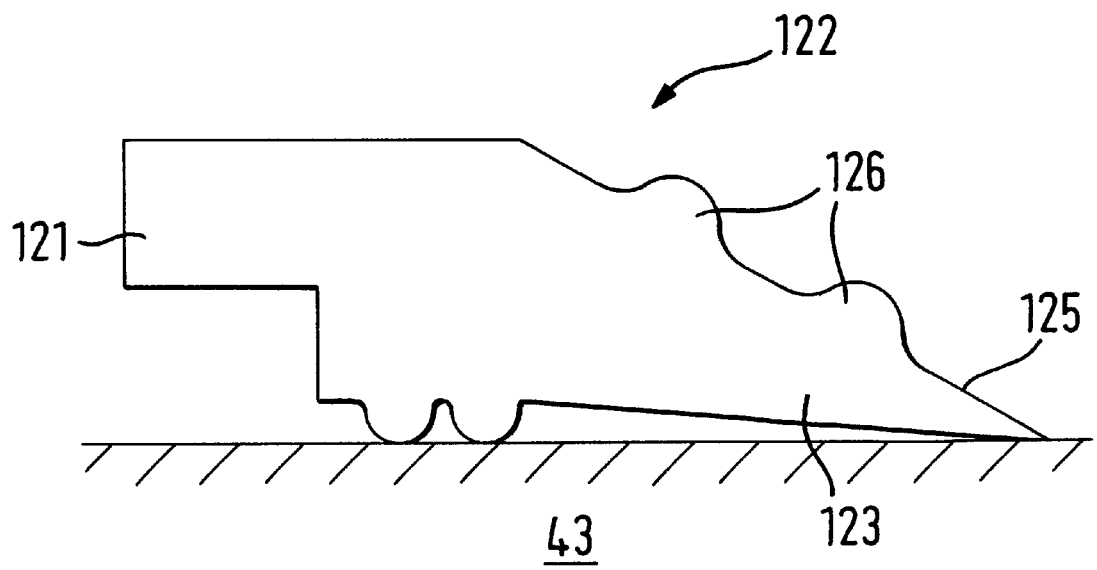
FIG. 12 is a sectional view through the sealing ring of FIG. 9 attached to a surface.

In FIGS. 11 and 12 there is shown a detail of a preferred sealing ring 122. The sealing ring 122 is similar to the ring 22 in that it has a peripheral inner flange 121 for clamping between the rigid plate 20 and the clamp ring 21 and it has generally triangular section sealing lips 123, 124. However, the outer surface 125 of the secondary sealing lip 123 has a pair of spaced, circumferentially extending reinforcing ribs 126 which render the sealing lip 123 more sturdy and less prone to damage.

When the device 10 is placed on a surface, the sealing lip 23, 123 engages the surface to effect a pre-seal because it projects axially further than the sealing lips 24, 124. When a vacuum is applied to the space 29, the main and back-up seals are formed by the compression of the seal lips 24 by the surface.

When a radial force is applied to the secured safety device, the rigid plate tends to move relative to the lip 23 in the direction of the force and this causes the sealing lip 23 to deflect upward in the direction of the force thus allowing moisture to enter. The provision of the ribs 126 tends to prevent such deflection, the ribs tending to force the periphery of the sealing lip 123 on to the surface, thus resulting in improved performance.

It has been found that two ribs give a satisfactory improvement in performance but one rib or even three or more ribs could be used. Also, the rib or ribs are preferably continuous around the periphery.

It will be appreciated that other materials of construction could be used and also the shape/relative dimensions of parts of the arrangements could be varied.

What is claimed is:

1. A safety device comprising:
   a vacuum anchor having a sealing member to contact a surface;
   a support portion attached to said sealing member, said support portion having a boss adapted to interchangeably receive additional equipment; wherein said support portion comprises a radially extending arm rotatably mounted on said boss;
   a vacuum assembly being operable to produce a vacuum below said sealing member such that said safety device is held with respect to the surface by suction, and a removable retaining plate, wherein said radially extending arm has a collar portion disposed around said boss, said collar portion being retained by said removable retaining plate,
   wherein said boss has a central blind bore extending axially therein to allow insertion of a mating part of the additional equipment, said central blind bore being independent of said vacuum assembly,
   said sealing member comprises a base plate attached to said boss, and a sealing ring secured with respect to said base plate and extending about a periphery of said base plate,
   said sealing ring has a pair of concentric main sealing lips and an additional secondary peripheral sealing lip disposed radially outward from said pair of concentric main sealing lips, and
   said additional secondary peripheral sealing lip has an outward facing surface which has at least one peripheral reinforcing rib.

2. A safety device comprising:
   a vacuum anchor having a sealing member to contact a surface;
   a support portion attached to said sealing member, said support portion having a boss adapted to interchangeably receive additional equipment, wherein said support portion comprises a radially extending arm rotatably mounted on said boss;
   a vacuum assembly being operable to produce a vacuum below said sealing member such that said safety device is held with respect to the surface by suction, and a removable retaining plate, wherein said radially extending arm has a collar portion disposed around said boss, said collar portion being retained by said removable retaining plate,
   wherein said boss has a central blind bore extending axially therein to allow insertion of a mating part of the additional equipment, said central blind bore being independent of said vacuum assembly,
   said sealing member comprises a base plate attached to said boss, and a sealing ring secured with respect to said base plate and extending about a periphery of said base plate,
   said sealing ring has a pair of concentric main sealing lips and an additional secondary peripheral sealing lip disposed radially outward from said pair of concentric main sealing lips, and
   said outward facing surface of said additional secondary peripheral sealing lip has two peripheral reinforcing ribs.

3. A safety device comprising:
   a vacuum anchor having a sealing member to contact a surface;
   a support portion attached to said sealing member, said support portion having a boss adapted to interchangeably receive additional equipment, wherein said support portion comprises a radially extending arm rotatably mounted on said boss;
   a vacuum assembly being operable to produce a vacuum below said sealing member such that said safety device is held with respect to the surface by suction; a removable retaining plate, wherein said radially extending arm has a collar portion disposed around said boss, said collar portion being retained by said removable retaining plate; and
   wherein said sealing member comprises a sealing ring having a pair of concentric main sealing lips and an additional secondary peripheral sealing lip disposed radially outward from said pair of concentric main sealing lips, said additional secondary peripheral sealing lip having an outward facing surface having at least one peripheral reinforcing rib,
   said support portion has a boss adapted interchangeably receive additional equipment,
   said boss has a central blind bore extending axially therein to allow insertion of a mating part of the additional equipment, said central blind bore being independent of said vacuum assembly.

* * * * *